US012620706B2

(12) United States Patent
Singh et al.

(10) Patent No.: US 12,620,706 B2
(45) Date of Patent: May 5, 2026

(54) RECONFIGURABLE INTELLIGENT SURFACES WITH INTEGRATED CHALCOGENIDE PHASE-DELAY ELEMENTS

(71) Applicant: Dell Products L.P., Round Rock, TX (US)

(72) Inventors: Tejinder Singh, Kanata (CA); Kan Wang, Ottawa (CA); Navjot Kaur Khaira, Kanata (CA); Morris Repeta, Ottawa (CA)

(73) Assignee: DELL PRODUCTS L.P., Round Rock, TX (US)

( * ) Notice: Subject to any disclaimer, the term of this patent is extended or adjusted under 35 U.S.C. 154(b) by 294 days.

(21) Appl. No.: 18/403,434

(22) Filed: Jan. 3, 2024

(65) Prior Publication Data

US 2025/0219289 A1 Jul. 3, 2025

(51) Int. Cl.
*H01P 1/15* (2006.01)
*H01P 1/18* (2006.01)
(Continued)

(52) U.S. Cl.
CPC ................. *H01Q 3/38* (2013.01); *H01P 1/15* (2013.01); *H01P 1/184* (2013.01); *H01Q 21/065* (2013.01); *H01Q 23/00* (2013.01)

(58) Field of Classification Search
CPC ............ H01Q 1/246; H01Q 3/32; H01Q 3/36; H01Q 21/065; H01Q 3/26; H01Q 21/062;
(Continued)

(56) References Cited

U.S. PATENT DOCUMENTS

| | | | | |
|---|---|---|---|---|
| 4,684,952 | A | 8/1987 | Munson et al. | |
| 6,604,505 | B2 * | 8/2003 | Hellmich .............. | F02M 63/06 123/295 |

(Continued)

FOREIGN PATENT DOCUMENTS

| | | |
|---|---|---|
| WO | 2023/147891 | 8/2023 |

OTHER PUBLICATIONS

Jost, et al., "Continuously Tuneable Liquid Crystal Stripline Phase Shifter Realised in LTCC Technology," in Proceedings of the 45th European Microwave Conference (EuMC). Paris, France: IEEE, Sep. 7-10, 2015, pp. 1260-1263.

(Continued)

*Primary Examiner* — John W Poos
(74) *Attorney, Agent, or Firm* — Amin, Turocy & Watson, LLP

(57) ABSTRACT

The technology described herein is directed towards a design and implementation of a unit cell for a reconfigurable intelligent surface/reflectarray by incorporating reconfigurability within a phase-delay element of the unit cell. Reconfigurability is directly incorporated into the unit cell via a variable length phase delay line element and PCM-based (e.g., mmWave) phase shifter that determines the unit cell's phase shift by changing the length of the phase delay line element. One implementation is directed to a monolithic integration of the element using chalcogenide materials as switch elements with pulsed actuation to switch among different available lengths that determine the length of the phase delay line element, resulting in a significant reduction in power consumption, area saving, and digital reconfigurability.

20 Claims, 11 Drawing Sheets

(51) Int. Cl.
*H01Q 3/38* (2006.01)
*H01Q 21/06* (2006.01)
*H01Q 23/00* (2006.01)

(58) Field of Classification Search
CPC .......... H01Q 23/00; H01Q 3/267; H01Q 1/38; H01Q 3/28; H01Q 3/34; H01Q 3/46; H01Q 5/35; H01Q 9/0421; H01Q 1/242; H01Q 15/0006; H01Q 15/002; H01Q 15/02; H01Q 15/148; H01Q 19/06; H01Q 19/17; H01Q 21/08; H01Q 21/205; H01Q 3/02; H01Q 3/38; H01Q 3/40; H01Q 1/1228; H01Q 1/1257; H01Q 1/247; H01Q 1/36; H01Q 1/42; H01Q 1/50; H01Q 21/067; H01Q 21/10; H01Q 3/005; H01Q 3/08; H01Q 3/22; H01Q 3/2605; H01Q 19/062; H01Q 19/195; H01Q 21/22; H01Q 21/26; H01Q 21/29; H01Q 21/30; H01Q 25/001; H01Q 25/002; H01Q 3/20; H01Q 3/30; H01Q 5/25; H03H 7/20; H03H 11/20; H03H 7/40; H03H 7/18; H03H 7/38; H01P 1/184; H01P 1/18; H01P 5/04; H01P 3/08; H01P 1/185; H01P 1/02; H01P 3/02; H01P 1/15; H01P 11/00; H01P 1/20; H01P 1/203; H01P 1/28; H01P 3/081; H01P 3/121; H01P 5/12; H01P 7/00
See application file for complete search history.

(56) References Cited

U.S. PATENT DOCUMENTS 7,335,492 B2 * 2/2008 Penttila .................... C07K 1/14
435/68.1
10,490,374 B2 * 11/2019 Borodulin ............ H10N 70/253
10,784,550 B2 * 9/2020 Lu ............................ H03H 7/20
2018/0138894 A1 * 5/2018 Belot ...................... H10N 79/00
2022/0406997 A1 * 12/2022 Adamski .............. H10N 70/231
2023/0216191 A1 7/2023 Kalateh et al.

OTHER PUBLICATIONS

Pillans, et al., "Advances in RF MEMS Phase Shifters from 15 GHz to 35 GHz," in Proceedings of the IEEE MTT-S International Microwave Symposium Digest (IMS). Montreal, QC, Canada: IEEE, Jun. 17-22, 2012, pp. 1-3.
Lee, et al., "Ka-Band Inductor-Shared SPnT DPnT Switches and Their Applications to TTD Phase Shifter," IEEE Transactions on Microwave Theory and Techniques, vol. 67, No. 7, pp. 2546-2554, 2019.
Min, et al., "Single-Ended and Differential Ka-band BiCMOS Phased Array Front-Ends," IEEE Journal of Solid-State Circuits, vol. 43, No. 10, pp. 2239-2250, 2008.
Nayeri, et al., "Reflectarray Antennas: Theory, Designs and Applications," Hoboken: Wiley-IEEE Press, 2018, Online ISBN: 9781118846728., pp. 1-410.
Nayeri, et al., "Reflectarray Antennas: Theory, Designs and Applications," Hoboken: Wiley-IEEE Press, 2018, Online ISBN: 9781118846728., pp. 411-820.
International Search Report and Written Opinion for PCT Application No. PCT/US2024/013725 mailed Sep. 27, 2024, 4 pages.
Rodrigues Davi V Q et al: "Optimized phase shifts in intelligent reflective surfaces for robust radar-based indoor coverage enhancement" Proc. SPIE 12535, Radar Sensor Technology XXVII, 1253508 (Jun. 14, 2023); 13 pages.
Singh Tejinder et al: "Recent Advancements in Reconfigurable mmwave Devices Based on Phase-Change and Metal Insulator Transition Materials", IEEE Journal of Microwaves, vol. 3, No. 2, Apr. 7, 2023, 25 pages.

* cited by examiner

RECONFIGURABLE INTELLIGENT SURFACES WITH INTEGRATED CHALCOGENIDE PHASE-DELAY ELEMENTS

BACKGROUND

Reconfigurable intelligent surfaces (alternatively referred to as intelligent reflective surfaces, or metasurfaces) are man-made thin reflective surfaces whose electromagnetic response can be electronically controlled. Intelligent reflective surfaces thus have the ability to boost the spectral energy and spectral efficiency of redirected electromagnetic waves. Because an intelligent reflective surface can change the phase shifts of signals reflected at the surface, intelligent reflective surfaces are being evaluated for use in beyond fifth generation (B5G) and sixth generation (6G) wireless communication and wireless sensing networks.

Traditionally, the elements, or unit cells, of a reconfigurable intelligent surface have a variable conductive patch size, wherein the size of the conductive patch determines the phase shift of the unit cell. By controlling the phase shifts among the unit cells of a reconfigurable intelligent surfaces, the reflections of the unit cells with respect to an impinging electromagnetic wave can be combined into a beam steered in a specified direction, or into multiple beams split into multiple directions.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
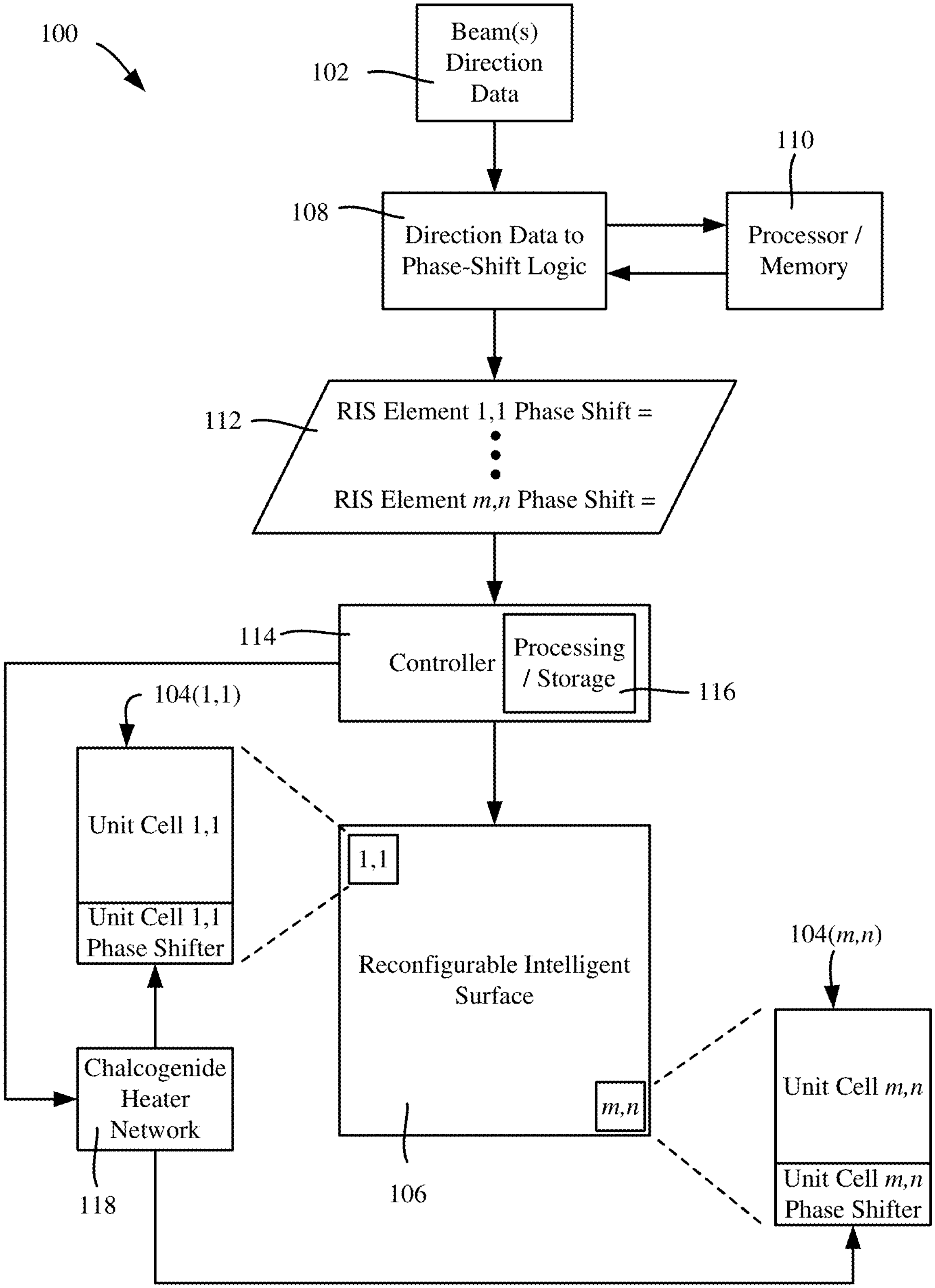
FIG. 1 is an example block diagram showing a system for controlling phase shifts of unit cells based on varying transmission line path lengths that determine lengths of phase-delay lines of the unit cells, in accordance with various example embodiments and implementations of the subject disclosure.

The technology described herein is generally directed towards a design and implementation of a reconfigurable intelligent surfaces (RIS) realized by incorporating reconfigurability within a phase-delay element of the unit cells that form the reconfigurable intelligent surfaces, as an alternative to the commonly used variable size element patch. The technology described herein overcomes many known problems with reconfigurable intelligent surfaces that have unit cells with variable patch sizes, including non-linearity of an element's phase profile caused by using a variable of resonating frequency for phase profile. Such non-linearity resulting from the variable patch sizes limits the achievable bandwidth of the reflectarray surface, because non-linearity leads to distorted radiation patterns, and further, the restricted operational bandwidth due to the non-linearity cannot effectively support wideband applications such as satellite and automotive radar systems. Another problem is fabricating reflectarrays with variable-sized elements, which requires high manufacturing precision due to its aggressive variation near its resonating frequency; imprecise element sizes result in performance degradation and reduced overall efficiency, which limits their use in high-frequency applications. Variable-sized elements also can introduce high insertion/reflection loss due to increased material usage, impedance mismatches and their usage in resonating frequency, which reduces the overall efficiency of a reflectarray, resulting in decreased signal strength, a lower signal-to-noise ratio and degraded system performance. Non-uniform loss distribution from variable patch sizes results in uneven power distribution and compromises the performance of a reflectarray, causing high sidelobes and a lower signal-to-noise ratio. Further, the irregularities introduced by the use of variable-sized elements violate the assumption of an infinite array, especially on the area where phase wrapping occurs; such a violation of the infinite array approximation can lead to deviations in the radiation pattern and degradation of the beam-steering capabilities of a reflectarray.

Instead, described herein introduces reconfigurability directly into a phase-delay element (via a variable length phase delay line element), which overcomes the various challenges associated with typically-used variable size conductive patches, including as improved bandwidth and reduced fabrication costs with lower precision requirements that result technology described herein. One implementation of the technology described herein is directed to a monolithic integration of the element using chalcogenide materials, such as germanium antimony telluride (GST) alloys. Usage of this material offers advantages such as negligible power consumption through pulsed actuation and reduced design and external wiring.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general. It also should be noted that terms used herein, such as "maximize" "optimize" or "optimal" and the like only represent objectives to move towards a more maximal or optimal state, rather than necessarily obtaining ideal results.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, materials and process features, and steps can be varied within the scope of the present disclosure.

Example embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a system 100 in which beam direction data 102 is used to determine the phase shifts of unit cells 104(1,1)-104(*m,n*) of a reconfigurable intelligent surface 106 (typically m=n to provide a square reconfigurable intelligent surface). In general, the beam direction data 102, which can refer to a single beam direction or multiple directions of a split beam, is determined by the unit cells' individually controllable phase shifts with respect to an electromagnetic wave impinging on the reconfigurable intelligent surface 106. Direction data-to-phase-shift logic 108, e.g., coupled to or incorporating a suitable processor and memory 110, converts the desired beam direction data to the respective individual phase shift data (values) 112 needed for each of the respective unit cells 104(1,1)-104(*m,n*) that will result in the desired beam direction data being achieved. As can be readily appreciated, the phase-shift logic 108 can be remote with respect to the location of the reconfigurable intelligent surface 106, as the individual phase shift data 112 can be determined at and communicated from a remote location to the reconfigurable intelligent surface location. Alternatively the requested beam direction data 102 can be communicated to the location of the reconfigurable intelligent surface 106, which can decide the phase shifts based thereon.

A controller 114, e.g., having some processing and storage capabilities (block 116) located at the reconfigurable intelligent surface 106 obtains or determines the individual phase shift values 112. Each of the unit cells 104(1,1)-104(*m,n*) includes a phase shifter as described herein, e.g., on the back surface of each unit cell. The phase shifters each comprises a number of single-pole, multiple-throw switches that are based on phase change material (chalcogenide) elements (component parts of the switches).

One or more intended uses of the technology described herein is for millimeter wave (mmWave) applications. With mmWave phase shifters, size and power consumption are significant criteria. For these reasons, a chalcogenide material-based phase shifter is designed and implemented with the advantages of monolithic integration and reduction in power consumption.

In general, a voltage or current pulse changes the resistance of the chalcogenide material from a low-resistance (conductive) state to a high-resistance (non-conductive) state or vice-versa, depending on the energy level and duration of the pulse. Significantly, once the chalcogenide material is in one of the states, the chalcogenide material remains in that state, without needing further power to maintain or refresh the state, that is, there is no power consumption after reconfiguration. Such an ability to latch chalcogenide elements in a state is facilitated via a pulse code modulation-based phase shifter, which is employed in one example implementation described herein. Thus, it is straightforward to construct a single-pole, multi-throw switch with individually controllable chalcogenide material elements with "open" position(s) corresponding to the high-resistance state(s) and a closed position corresponding to the low-resistance state, with only power consumed for changing the switch position.

Based on the individual phase shift values 112, the controller 114 controls a heater network 118 to change the resistances states of the chalcogenide elements, which in this implementation results in basically changing the "throw positions" of the switches formed with those chalcogenide elements. Note that only the chalcogenide elements that need changing need to be pulsed, e.g., if a switch is already in the correct position as a result of a previous phase shift scenario, which the controller 114 can evaluate with respect to the needed states corresponding to the just-received phase shift values, there is no need to pulse the chalcogenide elements that make up that particular switch.

Figure 2A:
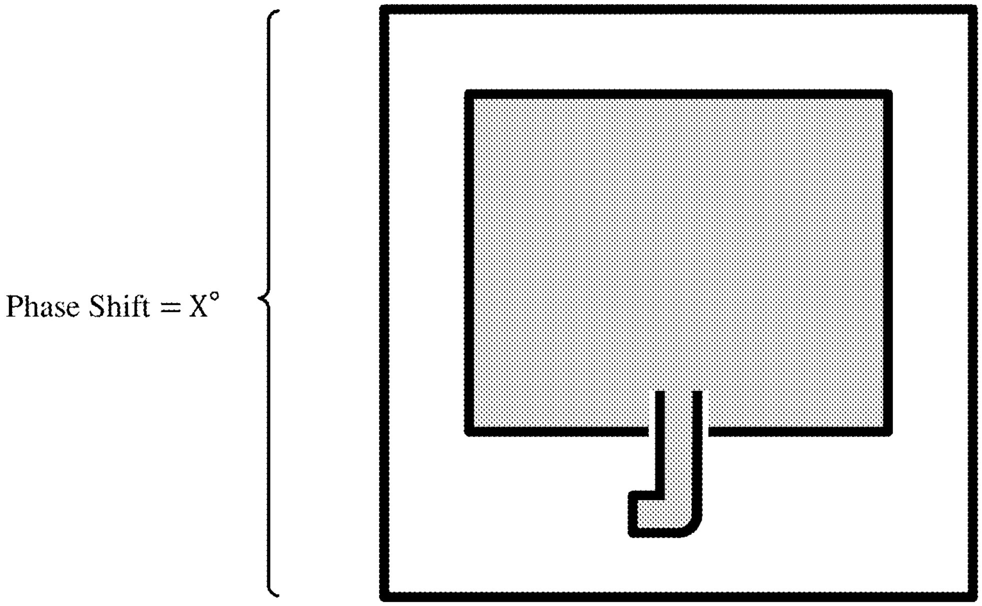
FIGS. 2A and 2B are representations of example unit cells conceptually showing different phase shifts corresponding to different lengths of a phase-delay line element of a unit cell, in accordance with various example embodiments and implementations of the subject disclosure.
Figure 2B:
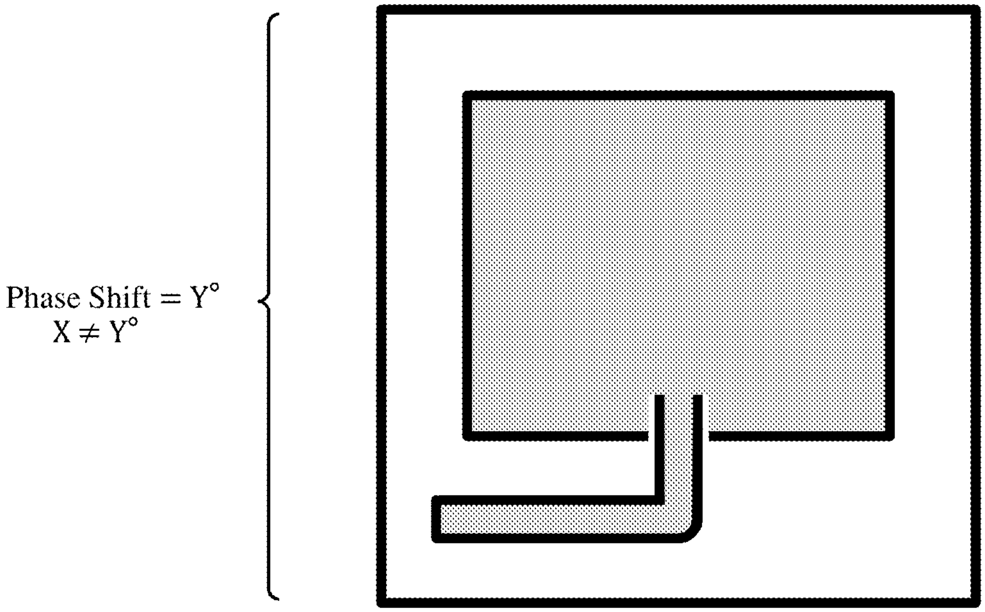

FIGS. 2A and 2B shows the concept of a variable phase delay line element, in which the phase delay/corresponding phase shift (X° or Y°) is based on the length of the phase delay line element coupled to the conductive portion. Note however that FIGS. 2A and 2B are only conceptual representations for purposes of explanation, as the depicted example physical geometries do not actually change as might be suggested by the different line element lengths of FIGS. 2A and 2B; rather, the length of the variable phase delay line is determined by controlling the resultant "throw positions" of the chalcogenide-based switches by controlling the states of the chalcogenide material elements that are the components of those switches. Significantly, the sizes of the conductive portion need not change to obtain the desired phase shift.

Described herein is incorporating reconfigurability into the phase-delay elements, which is unlike prior solutions that avoid phase-delay elements because of prior lack of reconfigurability, (and instead use elements with variable size patches, despite their many drawbacks). Reconfigurability is accomplished as described herein by selecting among different lengths of phase delay elements using chalcogenide-based switches.

Figure 3:
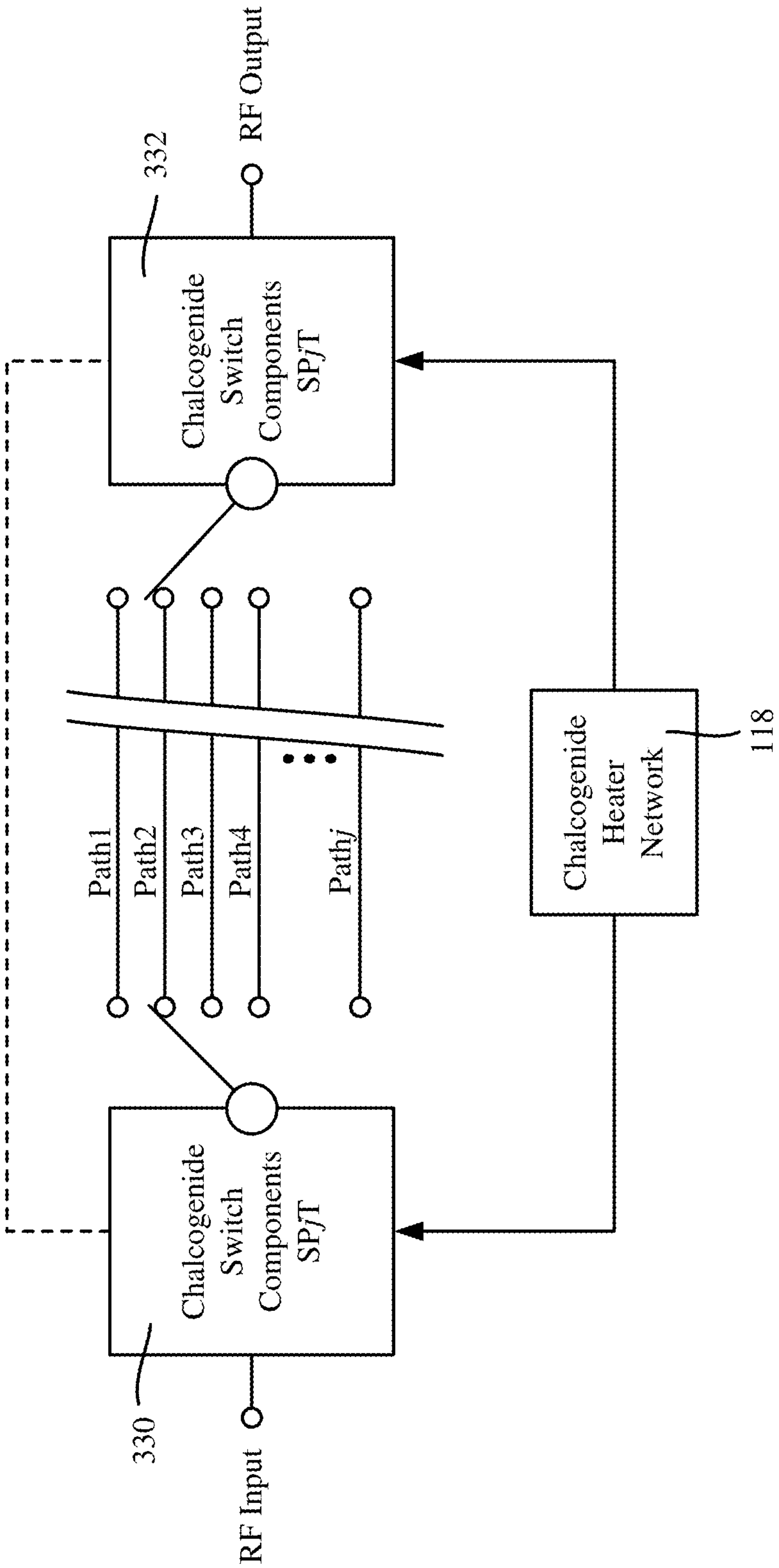
FIG. 3 is a representation of an example part of a phase shifter of a unit cell conceptually showing selection of different phase shifts by selecting among different length candidate paths for a phase-delay line of a unit cell, in accordance with various example embodiments and implementations of the subject disclosure.

FIG. 3 shows a general concept related to the reconfigurability of a phase delay element, in which one selected path among different candidate paths with different transmission line lengths from a radio frequency (RF) input terminal to an RF output terminal is selected based on the desired phase shift, which corresponds to one of the transmission line path lengths and the phase delay resulting therefrom. As shown in FIG. 3, two switches 330 and 332 based on chalcogenide elements in controllable states (controlled via the heater network 118) are coupled the RF input to the RF output, respectively through one of the paths (Path1-Pathj). In this example, the chalcogenide elements of the switches 330 and 332 (single-pole, j-throw, or SPjT where j represents the number of candidate paths from which to select) are in a low-resistance states with respect to coupling the RF input and RF output to Path2, and in high-resistance states with respect to the other candidate paths. Note that two such chalcogenide-based switches 330 and 332 are used at the start and end of any of the selectable paths, respectively, with respective matching counterpart chalcogenide element states, because in RF/microwave designs, the second switch 332 prevents the RF signal from flowing backwards, which would otherwise create standing waves and thus an impedance mismatch. Further, note that a single pole switch is employed at each end, because dividing the signal into two or more lines would cause an impedance mismatch as at the output, as part of the signal will arrive with intermodulation products (as an unwanted signal).

Figure 4:
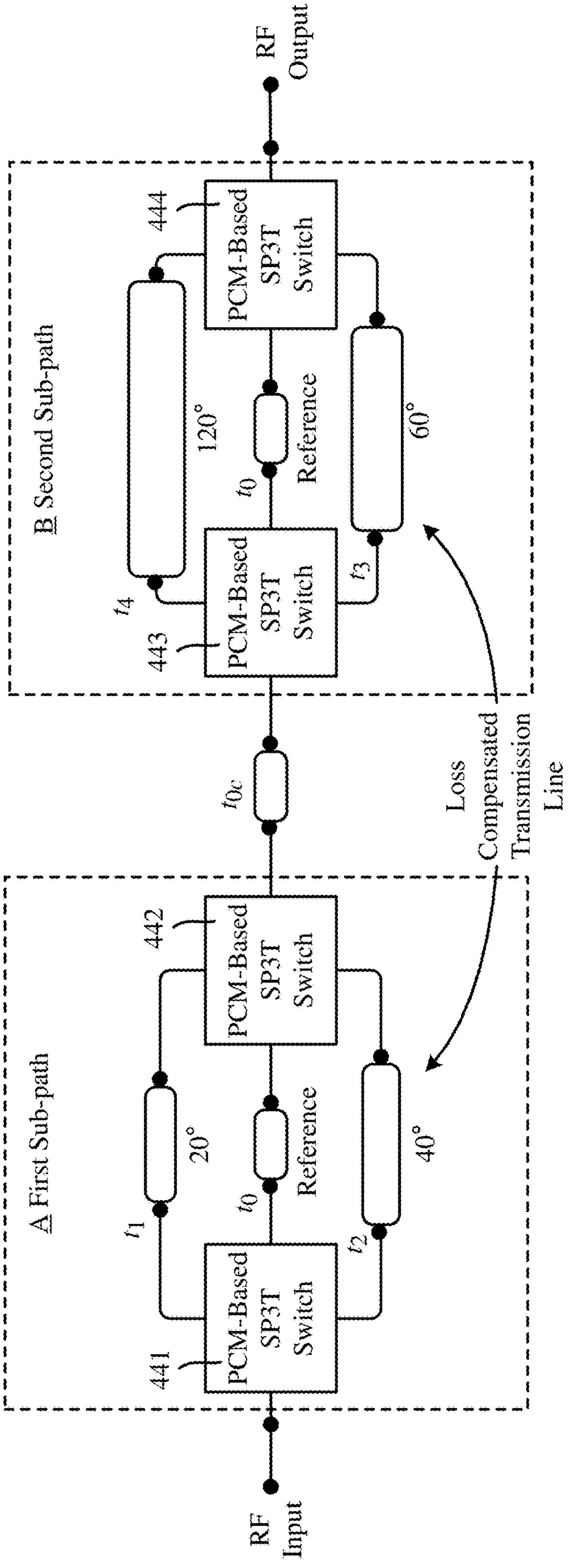
FIG. 4 is a representation of an example part of a phase shifter of a unit cell conceptually showing selection of different phase shifts by selecting among different first candidate sub-paths and selecting among different second candidate sub-paths, for a phase-delay line of a unit cell, in accordance with various example embodiments and implementations of the subject disclosure.

FIG. 4 generally shows a schematic of a loss-compensated 3-bit switched, two-stage phase shifter. In general, this example implementation provides a more practical implementation of switches and transmission lines (relative to FIG. 3), in which instead of selecting among each path individually, the lengths of two transmission line sub-path sections A and B can be additively combined to provide more phase shift candidate paths with fewer transmission lines. Further, although more chalcogenide-based switches are present than in FIG. 3, they have fewer chalcogenide elements, e.g., four single-pole triple-throw switches (SP3T) 441-444 are used in the example implementation of FIG. 4.

As can be seen in FIG. 4, the SP3T switches 441-444 are connected back-to-back, such that there are four switches and one common signal path port $t_{0_c}$. The signal coming from the RF input is fed to the switch 441. If no delay is needed for this first sub-path A, the signal can be routed to the middle path section (the $t_0$ transmission line), otherwise the $t_1$ transmission line can be selected, which has a length/delay corresponding to 20 degrees of phase shift, or the $t_2$ transmission line can be selected which has a length/delay corresponding to 40 degrees of phase shift. Similarly, the next SP3T switch 442 is connected in reverse, such that the signal from any path/port (the second half of sub-path A) goes to the common signal path port $t_{0_c}$.

The components of the second sub-path B are somewhat similar to those of sub-path A, except that the third switch 443 is connected to the common port $t_{0_c}$ and the fourth switch 444 is connected to the RF output terminal. Moreover, the available transmission line lengths include $t_3$ and $t_4$ (along with another instance of a reference/no delay $t_0$ transmission line), in which the $t_3$ transmission line corresponds to 60 degrees of phase shift and the $t_4$ transmission line corresponds to 120 degrees of phase shift.

As can be seen, changing the four switches' chalcogenide element states to select among (e.g., "mix and match") the candidate path lengths/transmission lines results in a phase delay of one of: of 0, 20, 40, 60, 80, 100, 120, 140 or 160 degrees. For example, to configure 80 degrees of phase shift, the chalcogenide elements' states are changed (if necessary) such that the path from the RF input to the RF output is via transmission paths $t_1$ and $t_3$.

Note that for loss compensation, in one implementation the widths of the transmission lines increase with the length of the transmission line. This reduces the variation of the loss that would otherwise occur without different widths.

As can be readily appreciated, FIG. 4 shows only one example implementation. In a different implementation, if more fine-grained phase delay selections are needed, for example, more than two sub-path sections (e.g., with smaller differences in degree selections per path) can be present, and/or other than SP3T switches can be used, e.g., SP4T, SP5T and so on. The number of throw positions for the switch pairs of one sub-path section can be different from the number of throw positions for the switch pairs in a different sub-path section.

Figure 5:
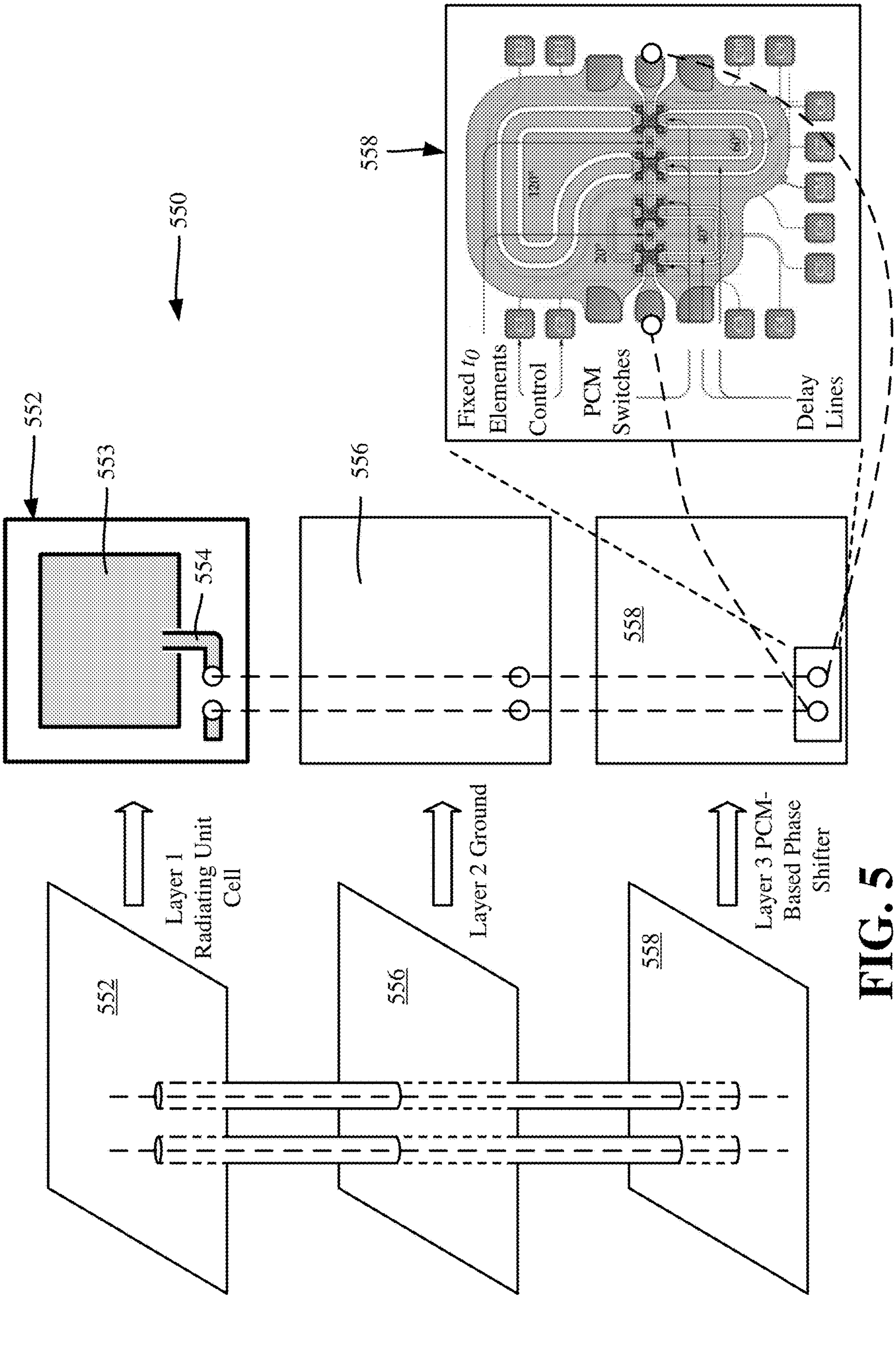
FIG. 5 is an exploded view representation of a unit cell in which the length of a variable length phase-delay line element is determined by a chalcogenide-based phase shifter that is part of the unit cell, in accordance with various example embodiments and implementations of the subject disclosure.

FIG. 5 shows how one implementation of a unit cell 550 can be constructed in accordance with the technology described herein, including with a first layer 552 containing the conductive portion (patch) 553 and a variable-length conductive phase-delay transmission line element 554. A ground layer 556 is a second layer, which is above a third layer that (on its underside) contains the PCM-based circuitry of the phase shifter 558. Vias 559 facilitate coupling of the RF input and output terminals (through the third layer 558, through the second (ground layer 556) and through the first layer 552) to complete a circuit in the variable-length conductive phase-delay transmission line element 554. In this way, the selected transmission lines of the phase shifter 558 conductively complete the circuit with the selected path length that determines the desired phase shift of the unit cell 550.

Figure 6:
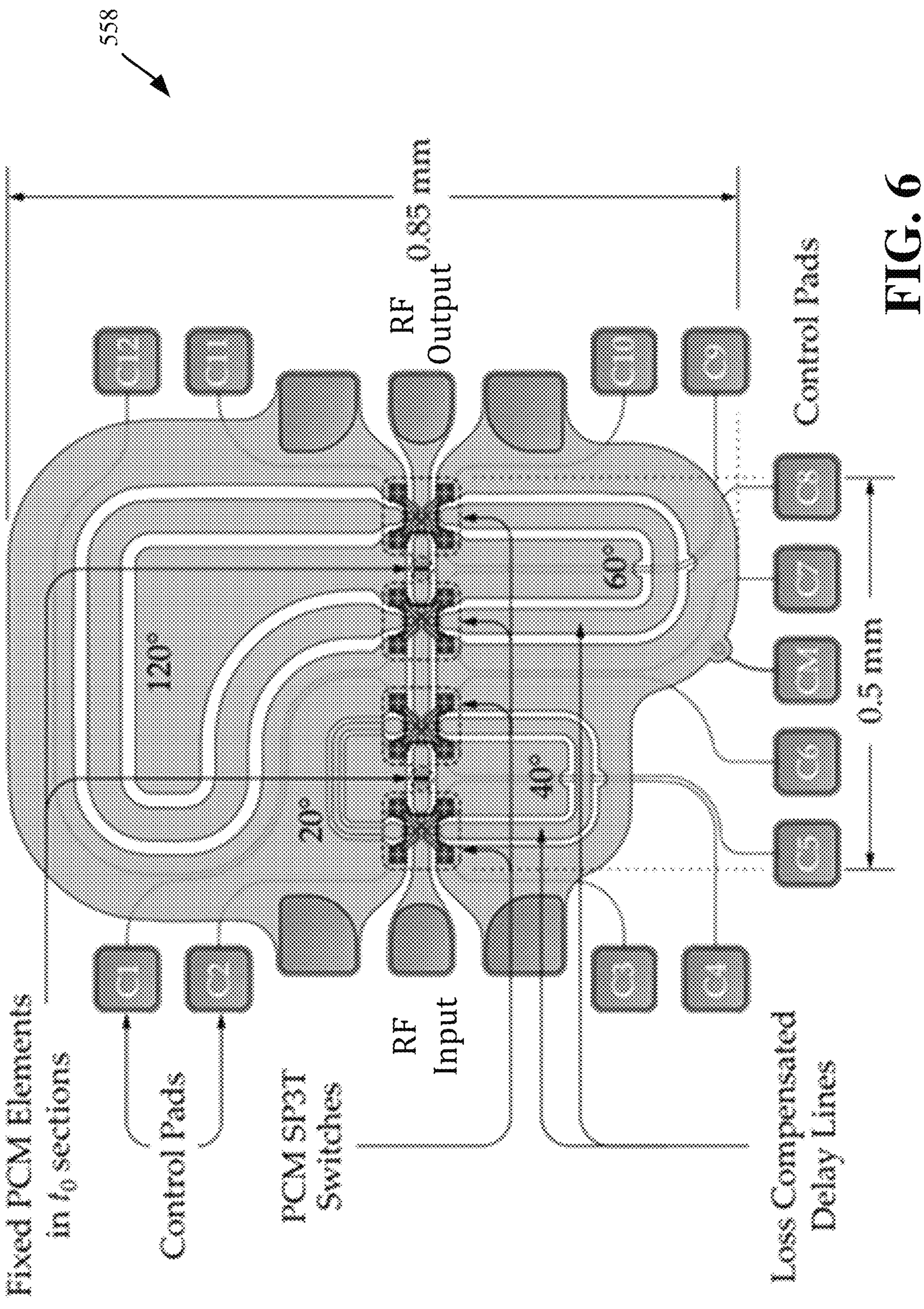
FIG. 6 is a representation of an example chalcogenide-based phase shifter that is part of a unit cell and is controlled by a pulse-code modulation-based (PCM-based) controller, in accordance with various example embodiments and implementations of the subject disclosure.

FIG. 6 shows additional details of one example phase shifter implementation 558. As can be seen, the longer transmission path lengths correspond to larger amounts of phase shift. As also can be seen, the longer the transmission path length, the wider the path width, for loss compensation mitigation. The control pads C1-C12 couple the phase shifter to the various other components described herein, including the heater network so that the PCM SPT3 switches (in this example) can be switched. Note that the chalcogenide elements of pairs of switches in each sub-path section can be controlled together using a shared pulse, and thus do not need individual control pads, although if shared in this way, the pulse energy (e.g., voltage) needs to be increased because such a shared pulse shares a path to two chalcogenide elements.

Figure 7:
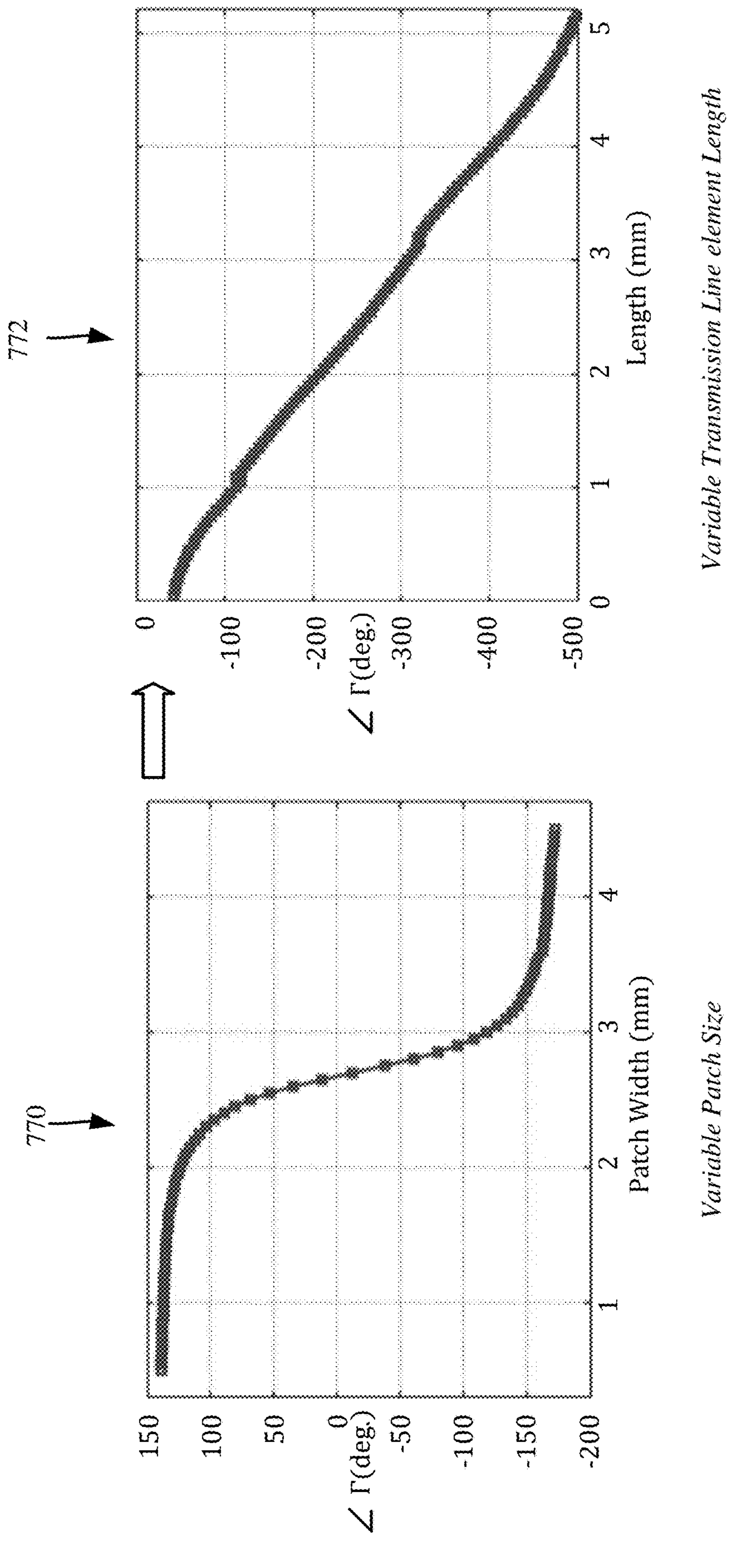
FIG. 7 is a graphical representation of the reflection phase of a unit cell with a variable length phase-delay line element, showing a substantially linear phase profile with a larger range in contrast to the non-linear phase profile of a variable patch size unit cell, in accordance with various example embodiments and implementations of the subject disclosure.

Numerical experiments were conducted to evaluate the performance between elements with variable size (as typically used), and elements with variable phase-delay line elements as described herein. FIG. 7 shows results of a variable element size simulation of the reflection magnitude with variable size element patches (graph plot 770) compared to the reflection magnitude of unit-cells embedded with phase-delay elements (graph plot 772). As demonstrated by the non-linear resulting curve in graph plot 770 versus the generally linear results in the graph plot 772, the phase profile of the elements with variable phase/time delay is significantly more linear that the prior variable patch size approach, with a larger range. This near-linearity means a reduction in phase range error and phase truncation error, and hence an increase in the reflective intelligent surface bandwidth.

Figure 8:
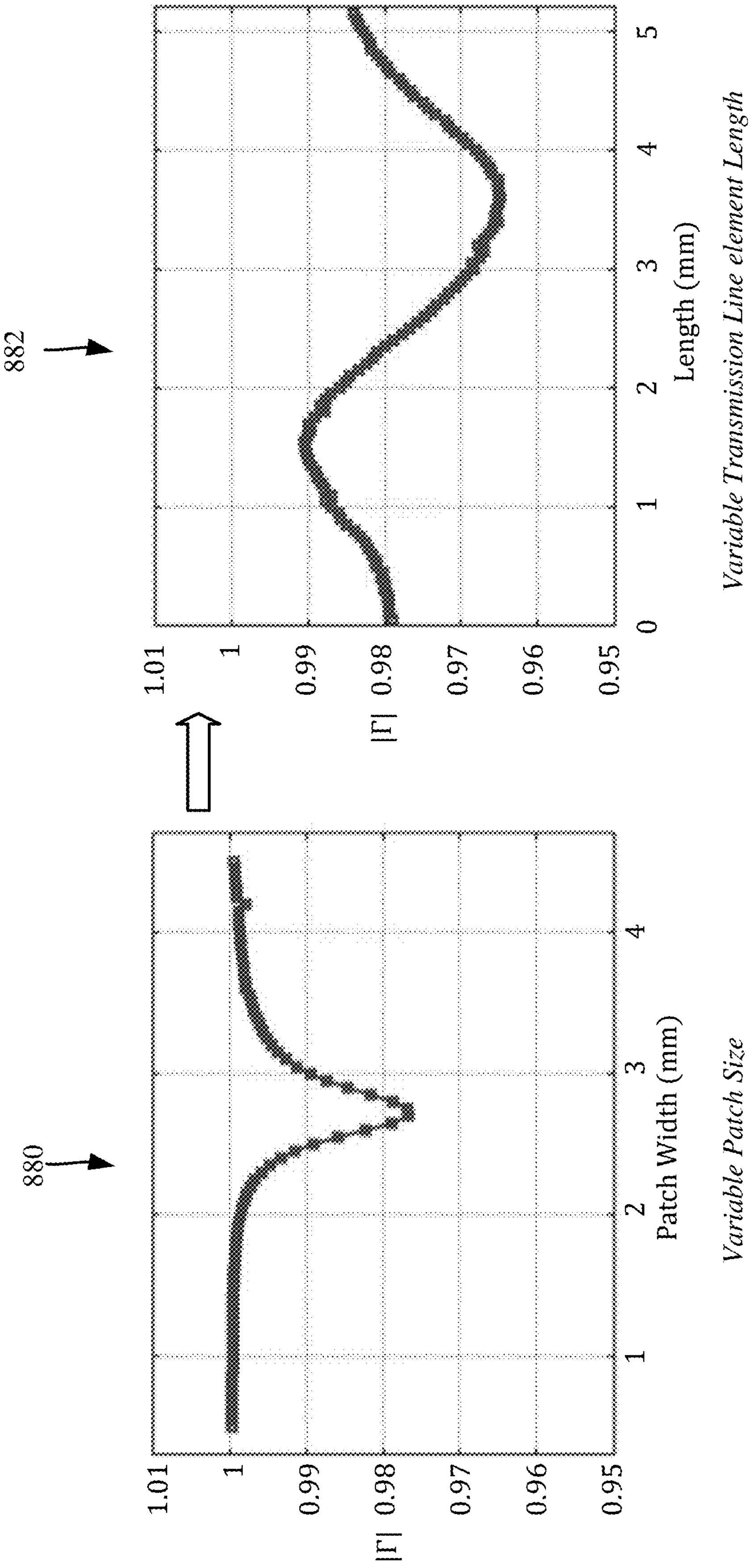
FIG. 8 is a graphical representation of the reflection magnitude of a unit cell with a variable length phase-delay line element, showing reduced magnitude variation in contrast to the magnitude variation of a variable patch size unit cell, in accordance with various example embodiments and implementations of the subject disclosure.

FIG. 8 shows a comparison between magnitude plots 880 and 882, showing how the magnitude variation is reduced with the variable phase/time delay unit cells compared to variable patch size approaches. This means when applying phase-only synthesis during design, the surface with a uniform magnitude is better approximated, hence a reduction in design error. A comparison between geometry plots also demonstrates that geometry variation is less aggressive with variable phase/time delay unit cells compared to those with variable patch size, which means an improvement on the infinite array approximation, and therefore less design errors.

Figure 9A:
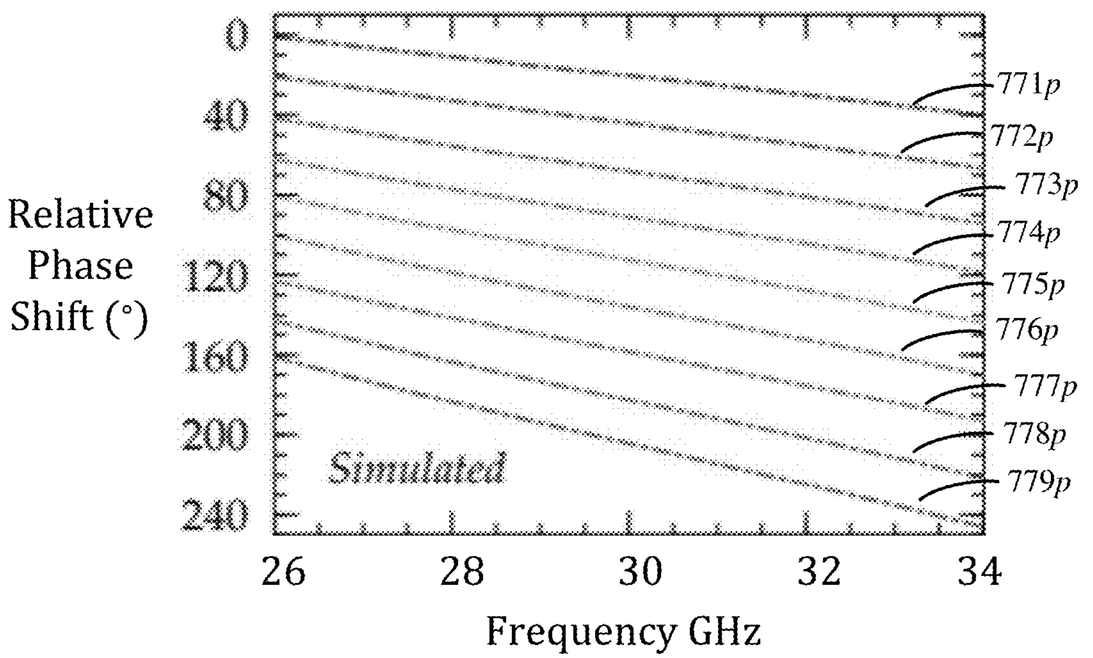
FIGS. 9A and 9B are graphical representations of simulated relative phase shift (FIG. 9A) and group delay (FIG. 9B) of the chalcogenide-based phase shifter in different phase shift states over a range of frequencies with a 25-34 GHz band, in accordance with various example embodiments and implementations of the subject disclosure.
Figure 9B:
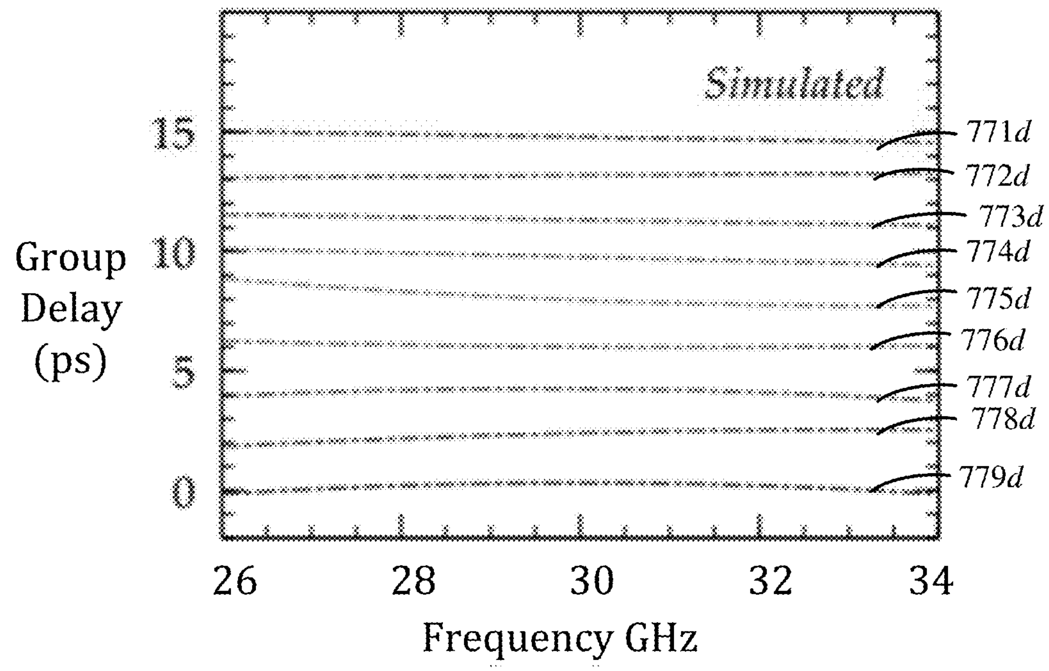

FIGS. 9A and 9B show finite element method (FEM) simulated relative phase shifts and group delays, respectively, of a chalcogenide-based phase shifter over 25-34 GHz band. The lines **771*p*-779*p* of FIGS. 9A and 771*d*-779*d*** represent different phase shifter states for the relative phase shifts and group delays, respectively.

In sum, described herein in general is providing reconfigurability to reflectarrays with phase-delay elements by the utilization of PCM-based mm Wave phase shifters, instead of using elements with variable size. This phase-delay-based element technology brings several advantages, including that the use of phase-delay elements offers reduced phase truncation errors, reduced deviation from infinite array approximation, and reduced phase range errors. At the same time, the use of PCM-based phase shifts offers the elimination of soldered components, fast switching, significant reduction in power consumption, area saving, and digital reconfigurability. By incorporating chalcogenide materials, the design process is simplified, reconfigurability is achieved, and the inherent benefits of using phase-delay lines are maintained.

Figure 10:
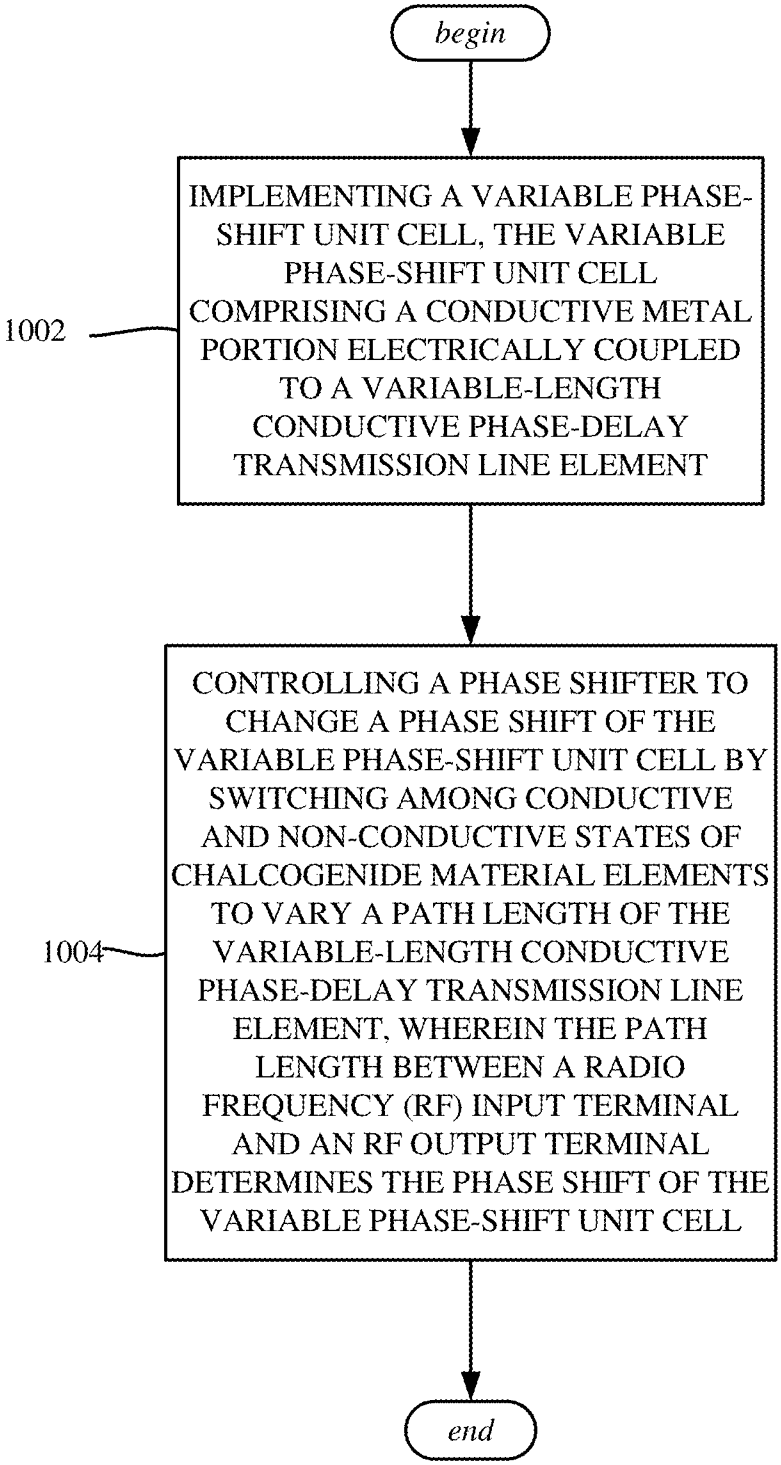
FIG. 10 is a flow diagram showing example operations related to controlling a phase shifter to change a phase shift of the variable phase-shift unit cell by switching among conductive and non-conductive states of chalcogenide material elements, in accordance with various example embodiments and implementations of the subject disclosure.

One or more example embodiments can be embodied in a system, such as represented in the example operations of FIG. 10, and for example can include a memory that stores computer executable components and/or operations, and a processor that executes computer executable components and/or operations stored in the memory. Example operations can include operation 1002, which represents implementing a variable phase-shift unit cell, the variable phase-shift unit cell comprising a conductive metal portion electrically coupled to a variable-length conductive phase-delay transmission line element. Example operation 1004 represents controlling a phase shifter to change a phase shift of the variable phase-shift unit cell by switching among conductive and non-conductive states of chalcogenide material elements to vary a path length of the variable-length conductive phase-delay transmission line element, wherein the path length between a radio frequency (RF) input terminal and an RF output terminal determines the phase shift of the variable phase-shift unit cell.

At least two of the chalcogenide material elements can form a chalcogenide material-based single-pole, multiple throw switch.

The path length of the variable-length conductive phase-delay transmission line element can correspond to a selected conductive path, selected by the phase shifter from among a group of candidate conductive paths, by determining respective conductive or non-conductive states of respective chalcogenide material elements of the chalcogenide material elements. Respective candidate conductive paths can correspond to respective different phase shift amounts, and the respective candidate conductive paths can have respective different conductive path widths that correspond to the respective different phase shifts.

The phase shifter can include a pulse code modulation-based controller coupled to a heater network to individually determine the respective conductive or non-conductive states of the respective chalcogenide material elements. The phase shift can be a first phase shift, and the pulse code modulation-based controller phase can apply pulsed energy to latch the respective conductive or non-conductive states of the respective chalcogenide material elements without applying further energy until the variable phase-shift unit cell is changed from the first phase shift to a second phase shift that is different from the first phase shift.

A subgroup of the chalcogenide material elements can be configured as a single-pole, multiple-throw switch, and controlling the phase shifter to change the phase shift can include switching among conductive and non-conductive states of the subgroup of the chalcogenide material elements to select the path length between the RF input terminal and the RF output terminal from among multiple different candidate path lengths corresponding to multiple switch positions of the multiple-throw switch. The subgroup can be a first subgroup configured as a first single-pole, multiple-throw switch at a beginning of the path length, a second subgroup of the chalcogenide material elements can be configured as a second single-pole, multiple-throw switch, and controlling the phase shifter to change the phase shift can include switching among conductive and non-conductive states of the second subgroup of the chalcogenide material elements to determine an end of the path length.

The candidate path lengths can include a first candidate path length that corresponds to a first amount of phase delay, a second candidate path length that corresponds to a second amount of phase delay, and a third candidate path length that corresponds to a reference phase delay; the first candidate path length, the second candidate path length, and the third candidate path length can be different from one another.

A first subgroup of the chalcogenide material elements can be configured as a first single-pole, multiple-throw switch, a second subgroup of the chalcogenide material elements can be configured as a second single-pole, multiple-throw switch, a third subgroup of the chalcogenide material elements can be configured as a third single-pole, multiple-throw switch, and a fourth subgroup of the chalcogenide material elements can be configured as a fourth single-pole, multiple-throw switch. Controlling of the phase shifter to change the phase shift can include switching among conductive and non-conductive states of the first subgroup and among conductive and non-conductive states of the second subgroup to select a first sub-path length from among multiple different candidate first sub-path lengths that correspond to multiple throw positions of the first single-pole, multiple-throw switch and multiple throw positions of the second single-pole, multiple-throw switch. Controlling of the phase shifter to change the phase shift can include switching among conductive and non-conductive states of the third subgroup and among conductive and non-conductive states of the fourth subgroup to select a second sub-path length from among multiple different candidate second sub-path lengths that correspond to multiple throw positions of the third single-pole, multiple-throw switch, and multiple throw positions of the second single-pole, multiple-throw switch. An output terminal of the second single-pole, multiple-throw switch can be coupled to an input terminal of the third single-pole, multiple-throw switch to add the first sub-path length to the second sub-path length to determine the path length between the RF input terminal and the RF output terminal.

The variable phase-shift unit cell can be one unit cell of a group of unit cells that form a reconfigurable intelligent surface, and the phase shift of the unit cell can determine part of a beam reflected as a beam by the reconfigurable intelligent surface from an electromagnetic wave impinging on the reconfigurable intelligent surface. The group of unit cells can include respective unit cells comprising respective conductive metal portions; the respective conductive metal portions can be matching or substantially matching in size.

Figure 11:
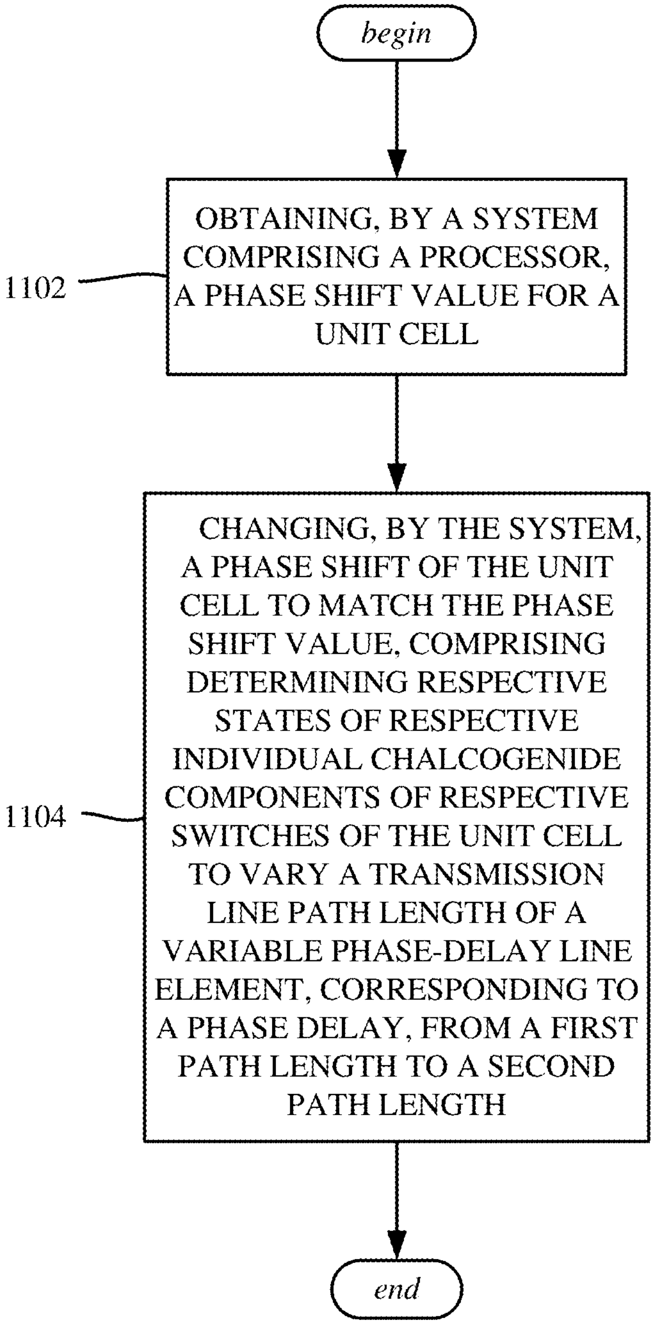
FIG. 11 is a flow diagram showing example operations related to changing a phase shift of a unit cell by determining respective states of respective individual chalcogenide components of respective switches of the unit cell, to vary a transmission line path length of a variable phase-delay line element, in accordance with various example embodiments and implementations of the subject disclosure.

One or more example embodiments, such as corresponding to example operations of a method, are represented in FIG. 11. Example operation 1102 represents obtaining, by a system comprising a processor, a phase shift value for a unit cell. Example operation 1102 represents changing, by the system, a phase shift of the unit cell to match the phase shift value, comprising determining respective states of respective individual chalcogenide components of respective switches of the unit cell to vary a transmission line path length of a variable phase-delay line element, corresponding to a phase delay, from a first path length to a second path length.

Changing the respective states of the respective individual chalcogenide components can include controlling a controllable heater network that selectively transfers heat to at least some of the respective individual chalcogenide components.

The transmission line path length can correspond to a first sub-path length of the phase-delay line corresponding to a first amount of phase shift, and a second sub-path length of the phase-delay line corresponding to a second amount of phase shift. Changing the respective states of the respective chalcogenide components can include controlling at least some of the respective states to add the first sub-path length of the phase-delay line to the second sub-path length of the phase-delay line to vary the transmission line path length of the variable phase-delay line element.

The transmission line path length can include a first sub-path length plus a second sub-path length, and changing the respective states of the respective chalcogenide components can include controlling at least some of the respective states to change the first sub-path length to a different first sub-path length.

One or more example embodiments can be embodied in a unit cell, such as described and represented herein. The unit cell can include a conductive patch, a phase delay element coupled to the conductive patch, and a phase shifter, the phase shifter including respective switches comprising respective chalcogenide material parts in respective low-resistance or high-resistance states, the phase shifter changing at least some of the respective low-resistance or high-resistance states of the respective chalcogenide material parts to select among available transmission paths that determine a length of the phase delay element, resulting in a phase shift of the unit cell with respect to redirecting an electromagnetic wave impinging on the unit cell.

The phase shifter can include a pulse code modulation-based controller that controls a heater network for changing the at least some of the respective low-resistance or high-resistance states of the respective chalcogenide material parts.

The length of the phase delay element can include a first sub-path length determined by the phase shifter, and a second sub-path length determined by the phase shifter.

The unit cell can be one unit cell of a group of unit cells that form a reconfigurable intelligent surface, and the phase shift of the unit cell can determine part of a beam reflected by the reconfigurable intelligent surface based on an electromagnetic wave impinging on the unit cell.

As can be seen, the technology described herein provides a unit cell with a variable phase change element that overcomes many of the issues with variable element patch size solutions. The phase-delay unit-cells described herein enable a linear phase profile across the array, which is highly desirable as it allows for precise control and manipulation of the electromagnetic wavefront across the array, leading to improved beamforming and beam-steering capabilities. The phase-delay unit-cells described herein offer improved bandwidth compared to variable-size unit-cells, because the linearity of the phase profile enables a wider range of phase shifts, allowing for broader frequency coverage and enhanced performance across a larger bandwidth. The use of phase-delay unit-cells reduces the sensitivity to fabrication imperfections, which reduces the error and fabrication cost; phase-delay unit-cells rely on accurate phase control, which is typically easier to achieve in fabrication. Phase-delay unit-cells can achieve better impedance matching, resulting in reduced power losses and improved overall efficiency of the reconfigurable intelligent surface. Phase-delay unit-cells offer a more uniform distribution of losses throughout the reconfigurable intelligent surface; (in contrast, with variable-size unit-cells, the non-uniformity of element sizes leads to non-uniform power distribution and uneven losses across the array, causing performance degradation). With phase-delay unit-cells as described herein, the power distribution is more balanced, resulting in improved performance consistency.

Further, phase-delay unit-cells helps mitigate the infinite array approximation violation by maintaining a more consistent and regular array structure, improving the applicability of theoretical models and simplifying system design. This is due to less geometrical structure being changed across unit-cells. As a result, the technology described herein provides significant prospects in enhancing the performance and efficiency of reconfigurable intelligent surface technology in mmWave/6G applications.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a processor; and a memory that stores executable instructions that, when executed by the processor, facilitate performance of operations, the operations comprising:

implementing a variable phase-shift unit cell, the variable phase-shift unit cell comprising a conductive metal portion electrically coupled to a variable-length conductive phase-delay transmission line element; and controlling a phase shifter to change a phase shift of the variable phase-shift unit cell by switching among conductive and non-conductive states of chalcogenide material elements to vary a path length of the variable-length conductive phase-delay transmission line element, wherein the path length between a radio frequency (RF) input terminal and an RF output terminal determines the phase shift of the variable phase-shift unit cell, wherein at least two of the chalcogenide material elements comprise a chalcogenide material-based single-pole, multiple throw switch.

2. The system of claim 1, wherein the path length of the variable-length conductive phase-delay transmission line element corresponds to a selected conductive path, selected by the phase shifter from among a group of candidate conductive paths, by determining respective conductive or non-conductive states of respective chalcogenide material elements of the chalcogenide material elements.

3. The system of claim 2, wherein respective candidate conductive paths correspond to respective different phase shift amounts, and wherein the respective candidate conductive paths have respective different conductive path widths that correspond to the respective different phase shifts.

4. The system of claim 2, wherein the phase shifter comprises a pulse code modulation-based controller coupled to a heater network to individually determine the respective conductive or non-conductive states of the respective chalcogenide material elements.

5. The system of claim 4, wherein the phase shift is a first phase shift, and wherein the pulse code modulation-based controller phase applies pulsed energy to latch the respective conductive or non-conductive states of the respective chalcogenide material elements without applying further energy until the variable phase-shift unit cell is changed from the first phase shift to a second phase shift that is different from the first phase shift.

6. The system of claim 1, wherein a subgroup of the chalcogenide material elements is configured as a single-pole, multiple-throw switch, and wherein the controlling of the phase shifter to change the phase shift comprises switching among conductive and non-conductive states of the subgroup of the chalcogenide material elements to select the path length between the RF input terminal and the RF output terminal from among multiple different candidate path lengths corresponding to multiple switch positions of the multiple-throw switch.

7. The system of claim 6, wherein the subgroup is a first subgroup configured as a first single-pole, multiple-throw switch at a beginning of the path length, wherein a second subgroup of the chalcogenide material elements is configured as a second single-pole, multiple-throw switch, and wherein the controlling of the phase shifter to change the phase shift comprises switching among conductive and non-conductive states of the second subgroup of the chalcogenide material elements to determine an end of the path length.

8. The system of claim 6, wherein the candidate path lengths comprise a first candidate path length that corresponds to a first amount of phase delay, a second candidate path length that corresponds to a second amount of phase delay, and a third candidate path length that corresponds to a reference phase delay, and wherein the first candidate path length, the second candidate path length, and the third candidate path length are different from one another.

9. The system of claim 1, wherein a first subgroup of the chalcogenide material elements is configured as a first single-pole, multiple-throw switch, wherein a second subgroup of the chalcogenide material elements is configured as a second single-pole, multiple-throw switch, wherein a third subgroup of the chalcogenide material elements is configured as a third single-pole, multiple-throw switch, and wherein a fourth subgroup of the chalcogenide material elements is configured as a fourth single-pole, multiple-throw switch, wherein the controlling of the phase shifter to change the phase shift comprises:

switching among conductive and non-conductive states of the first subgroup and among conductive and non-conductive states of the second subgroup to select a first sub-path length from among multiple different candidate first sub-path lengths that correspond to multiple throw positions of the first single-pole, multiple-throw switch and multiple throw positions of the second single-pole, multiple-throw switch; and switching among conductive and non-conductive states of the third subgroup and among conductive and non-conductive states of the fourth subgroup to select a second sub-path length from among multiple different candidate second sub-path lengths that correspond to multiple throw positions of the third single-pole, multiple-throw switch, and multiple throw positions of the second single-pole, multiple-throw switch, and wherein an output terminal of the second single-pole, multiple-throw switch is coupled to an input terminal of the third single-pole, multiple-throw switch to add the first sub-path length to the second sub-path length to determine the path length between the RF input terminal and the RF output terminal.

10. The system of claim 1, wherein the variable phase-shift unit cell is one unit cell of a group of unit cells that form a reconfigurable intelligent surface, and wherein the phase shift of the variable phase-shift unit cell determines part of a beam reflected as a beam by the reconfigurable intelligent surface from an electromagnetic wave impinging on the reconfigurable intelligent surface.

11. The system of claim 10, wherein the group of unit cells comprise respective unit cells comprising respective conductive metal portions, and wherein the respective conductive metal portions are matching or substantially matching in size.

12. A method, comprising:

obtaining, by a system comprising a processor, a phase shift value for a unit cell; and changing, by the system, a phase shift of the unit cell to match the phase shift value, comprising determining respective states of respective individual chalcogenide components of respective switches of the unit cell to vary a transmission line path length of a variable phase-delay line element, corresponding to a phase delay, from a first path length to a second path length, wherein the transmission line path length comprises a first sub-path length plus a second sub-path length, and wherein the changing of the respective states of the respective chalcogenide components comprises controlling at least some of the respective states to change the first sub-path length to a different first sub-path length.

13. The method of claim 12, wherein the changing of the respective states of the respective individual chalcogenide components comprises controlling a controllable heater network that selectively transfers heat to at least some of the respective individual chalcogenide components.

14. The method of claim 12, wherein the transmission line path length corresponds to a first sub-path length of the variable phase-delay line element corresponding to a first amount of phase shift, and a second sub-path length of the variable phase-delay line element corresponding to a second amount of phase shift, and wherein the changing of the respective states of the respective chalcogenide components comprises controlling at least some of the respective states to add the first sub-path length of the variable phase-delay line element to the second sub-path length of the variable phase-delay line element to vary the transmission line path length of the variable phase-delay line element.

15. A unit cell, comprising:

a conductive patch;

a phase delay element coupled to the conductive patch; and a phase shifter, the phase shifter comprising respective switches comprising respective chalcogenide material parts in respective low-resistance or high-resistance states, the phase shifter changing at least some of the respective low-resistance or high-resistance states of the respective chalcogenide material parts to select among available transmission paths that determine a length of the phase delay element, resulting in a phase shift of the unit cell with respect to redirecting an electromagnetic wave impinging on the unit cell, wherein the phase shifter comprises a pulse code modulation-based controller that controls a heater network for changing the at least some of the respective low-resistance or high-resistance states of the respective chalcogenide material parts.

16. The unit cell of claim 15, wherein the length of the phase delay element comprises a first sub-path length determined by the phase shifter, and a second sub-path length determined by the phase shifter.

17. The unit cell of claim 15, wherein the unit cell is one unit cell of a group of unit cells that form a reconfigurable intelligent surface, and wherein the phase shift of the unit cell determines part of a beam reflected by the reconfigurable intelligent surface based on an electromagnetic wave impinging on the unit cell.

18. The system of claim 1, wherein the path length comprises a first sub-path length plus a second sub-path length, and wherein the controlling of the phase shifter comprises controlling at least some of respective states to change the first sub-path length to a different first sub-path length.

19. The system of claim 1, wherein the phase shifter comprises a pulse code modulation-based controller that controls a heater network for changing the at least some of respective low-resistance or high-resistance states of the chalcogenide material elements.

20. The unit cell of claim 15, wherein at least two of the chalcogenide material parts comprise a chalcogenide material-based single-pole, multiple throw switch.

* * * * *